(12) United States Patent
Owens et al.

(10) Patent No.: US 6,829,116 B1
(45) Date of Patent: Dec. 7, 2004

(54) AUTOMATED TAPE CARTRIDGE AUTOLOADER/LIBRARY SYSTEM

(75) Inventors: John C. Owens, Arvada, CO (US); Pat Eliot Collins, Colorado Springs, CO (US); Ryan Stuart Porter, Monument, CO (US); Peter A. Johnson, Black Forest, CO (US); Alexander Chan, Colorado Springs, CO (US); Kim M. Thomas, Colorado Springs, CO (US); Christopher Lee Felton, Colorado Springs, CO (US); David Ray Berry, Colorado Springs, CO (US); Thua Nang Dai, Colorado Springs, CO (US); Dominic John Maglia, Pueblo, CO (US); Theodore James Oade, Colorado Springs, CO (US); Scott Ryan Patterson, Manitou Springs, CO (US); Gary Eugene Sadler, Colorado Springs, CO (US); Sam Wen, Superior, CO (US)

(73) Assignee: Quantum Corporation, San Jose, CA (US)

( * ) Notice: Subject to any disclaimer, the term of this patent is extended or adjusted under 35 U.S.C. 154(b) by 0 days.

(21) Appl. No.: 09/710,645

(22) Filed: Nov. 10, 2000

(51) Int. Cl.[7] .......................... G11B 17/00; G11B 15/68
(52) U.S. Cl. .......................... 360/69; 360/92
(58) Field of Search .............................. 360/69, 71, 92; 414/932, 282, 283; 242/337, 337.1, 335; 700/214; 369/30.38, 30.39, 30.45, 30.7, 30.71, 30.72

(56) References Cited

U.S. PATENT DOCUMENTS 4,063,294 A  12/1977  Burkhart (List continued on next page.)

FOREIGN PATENT DOCUMENTS

| DE | 37 21821 C1 | 10/1988 |
|---|---|---|
| EP | 0 334 257 A2 | 9/1989 |
| EP | 0 426 456 B1 | 5/1991 |
| EP | 0 578 536 A3 | 1/1994 |
| EP | 0 725 398 B1 | 8/1996 |
| EP | 1 045 382 A2 | 10/2000 |
| JP | 62 134852 | 6/1987 |
| JP | 62 239372 | 10/1987 |
| JP | 06 052657 | 2/1994 |
| WO | WO89/08311 | 9/1989 |
| WO | WO 01/0988 A1 | 2/2001 |
| WO | WO 02/11135 A1 | 2/2002 |

OTHER PUBLICATIONS

Material from Worldwide Web @www.m4data–usa.com/products/magfile__1.html.

*Primary Examiner*—Andrew L. Sniezek
(74) *Attorney, Agent, or Firm*—Morrison & Foerster LLP

(57) ABSTRACT

The tape cartridge autoloader library system comprises at least one read/write tape drive, a tape cartridge picker, a single tape cartridge interface, and at least one pair of tape cartridge transport magazines within a compact form factor that fits into a standard library rack mount of cabinet. The autoloader/library system is a complete tape cartridge library that stores, manages, and automatically exchanges a plurality of tape cartridges between the tape drive unit, the single cartridge interface, and the tape cartridge transport magazines. The tape cartridge transport magazines are each configured to receive and store a plurality of individual tape cartridges in a horizontal relationship. The tape cartridge transport magazines also transport the individual tape cartridges within the tape cartridge transport magazine so that a specific one of the tape cartridges is in position for selection by the cartridge picker. The cartridge picker is configured to rotate to position the cartridge picker to exchange the individual tape cartridges with one of the tape drive, the tape cartridge transport magazines, and/or the single tape cartridge interface. The single cartridge interface is configured to receive individual tape cartridges for either storage in one of the tape cartridge transport magazines or read/write operations in the tape drive.

27 Claims, 16 Drawing Sheets

U.S. PATENT DOCUMENTS

| | | | | |
|---|---|---|---|---|
| 4,635,150 A | * | 1/1987 | Kato et al. | 360/98.06 |
| 4,910,619 A | | 3/1990 | Suzuki et al. | 360/92 |
| 4,981,409 A | | 1/1991 | Hirose et al. | 414/225 |
| 5,089,920 A | | 2/1992 | Bryer et al. | 360/92 |
| 5,293,284 A | | 3/1994 | Sato et al. | 360/92 |
| 5,442,500 A | * | 8/1995 | Hidano et al. | 360/92 |
| 5,449,091 A | | 9/1995 | Dalziel | |
| 5,469,310 A | * | 11/1995 | Slocum et al. | 360/92 |
| 5,515,213 A | | 5/1996 | Elliott | |
| 5,537,378 A | | 7/1996 | Uehara et al. | 369/77.2 |
| 5,631,785 A | | 5/1997 | Dang et al. | 360/92 |
| 5,663,938 A | * | 9/1997 | Dang et al. | 369/30.39 |
| 5,682,276 A | | 10/1997 | Hinnen et al. | |
| 5,746,385 A | | 5/1998 | Leger et al. | |
| 5,752,668 A | | 5/1998 | Patterson et al. | |
| 5,760,995 A | | 6/1998 | Heller et al. | 360/92 |
| 5,793,564 A | * | 8/1998 | Nakase et al. | 360/92 |
| 5,847,897 A | | 12/1998 | Marlowe | |
| 5,856,894 A | | 1/1999 | Marlowe | |
| 5,959,803 A | | 9/1999 | Okamoto et al. | |
| 5,975,450 A | | 11/1999 | Leger et al. | |
| 5,999,356 A | * | 12/1999 | Dimitri et al. | 360/71 |
| 6,064,544 A | * | 5/2000 | Wada | 360/92 |
| 6,097,566 A | | 8/2000 | Heller et al. | 360/92 |
| 6,130,800 A | | 10/2000 | Ostwald | |
| 6,381,089 B1 | * | 4/2002 | Helmick et al. | 360/92 |
| 6,441,991 B2 | * | 8/2002 | Ostwald et al. | 360/92 |
| 6,476,999 B1 | * | 11/2002 | Meikle et al. | 360/92 |
| 6,496,325 B1 | * | 12/2002 | Kersey et al. | 360/92 |
| 6,498,771 B1 | * | 12/2002 | Boyce et al. | 369/30.34 |
| 6,532,131 B1 | * | 3/2003 | Kappel et al. | 360/92 |

* cited by examiner

AUTOMATED TAPE CARTRIDGE AUTOLOADER/LIBRARY SYSTEM

BACKGROUND OF THE INVENTION

1. Field of the Invention

The invention is related to the field of data storage, and in particular, to a method and system for managing, storing and providing a plurality of tape cartridges for access to tape drives.

2. Background

A popular device for handling large amounts of information in a data processing system is an automated tape cartridge library. Tape cartridge libraries store and manage large numbers of tape cartridges containing magnetic tape on which data is recorded. Typically, a tape cartridge library is comprised of a plurality of fixed tape cartridge storage locations and at least one read/write tape drive. The tape cartridge storage locations are arranged in predetermined arrays of uniquely identified cells with each cell containing a single tape cartridge. Each of the individual tape cartridges include a computer readable identifying indicia, such as a bar code.

A tape cartridge retrieval/transport mechanism automatically exchanges the individual tape cartridges between their storage locations and the tape drive. Different types of tape cartridge retrieval/transport mechanisms are used to accommodate the various tape cartridge arrangements in different tape cartridge library systems. One example of a tape cartridge retrieval/transport mechanism utilizes a rotatable robotic arm with an optical sensor for selecting and retrieving the correct tape cartridge and transporting the tape cartridge to the one or more tape drives. Another example of a tape cartridge retrieval/transport mechanism is a linear robotic mechanism that moves along an X-Y translation or about a pivot in a rotary motion to select, retrieve and transport tape cartridges to the one or more tape drives. The tape drive is operable to read/write data from or to the magnetic tape in the tape cartridge. A host computer that communicates with a library control unit typically controls operation of the tape library system. In all of these architectures, the tape cartridge retrieval/transport mechanism is a complex mechanism which must translate among the multitude of fixed tape cartridge storage locations, moving in three dimensions to retrieve selected tape cartridges for insertion into the tape drive. The complexity of this tape cartridge retrieval/transport mechanism accounts for a significant component of the cost of the tape cartridge library systems and requires a significant amount of space to implement. Therefore, the cost of a tape cartridge library system cannot be justified in many applications unless there are a large number of tape cartridges that are stored and managed by the tape cartridge library system.

The tape drive is typically mounted within or juxtaposed to the tape cartridge library system and is operable to read/write data from or to the magnetic tape in the tape cartridge. A host computer that communicates with a library control unit and the tape drive(s) typically controls operation of the tape cartridge library system.

Automated tape cartridge library systems, however, suffer from numerous drawbacks. Three major and related drawbacks of these systems are cost, the lack of expandability and the overall size. Unfortunately, simply adding additional tape cartridge storage locations to add capacity to a library system results in an unacceptably slow tape cartridge retrieval and transport response time and additional size. One solution to this problem is the addition of another tape cartridge library system. However, this increases the system size and space required for data storage. Additionally, the load balancing between multiple tape cartridge library systems is often difficult, and in many instances, it is desirable to move data cartridges from one tape cartridge library system to another tape cartridge library system to balance the workload. In this case, a pass through mechanism is utilized to permit the exchange of tape cartridges between multiple tape cartridge library systems. Unfortunately, these pass through systems require that the tape cartridge libraries be specially designed with a common interface. One example of this interface is a common wall between two tape cartridge library systems. The common wall allows for the insertion of tape cartridges into slots in the wall by one tape cartridge library system while the other tape cartridge library system accesses the tape cartridges from the common wall on the other side.

These solutions, while solving one problem, also pose additional problems that result in additional system complexity, expense, and size. For example, the unique identifying information for each tape cartridge is affixed to a face of the tape cartridge that protrudes from a cell when the tape cartridge is stored therein. The pass-through system must therefore remove a tape cartridge from a first tape cartridge library system at a first orientation and rotate the tape cartridge to a second orientation for the second and adjacent tape cartridge library system. These and other problems become more pronounced when still additional tape cartridge libraries are added.

Therefore, there exists a need in the art of data storage for a tape cartridge library system that simplifies the storage and handling of large amounts of information, reduces the size of the system and space required for data storage, while at the same time being scalable, upgradable, and expandable.

SUMMARY

The present invention solves the problems outlined above and advances the art by providing an automated tape cartridge autoloader/library system, termed "autoloader/library system" herein. The autoloader/library system comprises at least one read/write tape drive, a tape cartridge picker, a single tape cartridge interface, and at least one of a pair of tape cartridge transport magazines within a compact form factor that fits into a standard library rack mount or cabinet. The autoloader/library system is a complete tape cartridge library that stores, manages, and automatically exchanges a plurality of tape cartridges between the tape drive unit, the single cartridge interface, and the tape cartridge transport magazines. The autoloader/library system can either function as a traditional tape cartridge library system where the plurality of tape cartridges stored in the magazine(s) are managed by the autoloader/library system, or the autoloader/library system can function to present a plurality of scratch (blank) tapes to the tape drive(s) for the writing of data thereon. In this latter application, the magazine functions to queue a plurality of scratch tapes for the tape drive(s) so that data can be written on each of the scratch tapes without the necessity of an operator having to manually load scratch tapes into the tape drive(s).

The autoloader/library system is architected such that the components therein are substantially coplanar and the movement of the picker is limited to simple rotation and optional elevation repositioning to thereby simplify the mechanisms used to implement the autoloader/library system and reduce the cost. The tape cartridge transport magazines are each configured to receive and store a plurality of individual tape cartridges in a horizontal relationship. The tape cartridge transport magazines also transport the individual tape cartridges within the tape cartridge transport magazine so that any one of the tape cartridges can be positioned for selection by the cartridge picker. The cartridge picker does not need to translate in three dimensions as in prior art tape cartridge library systems, but instead is configured to rotate within a stationary picker base to position the cartridge picker to exchange the individual tape cartridges with one of: the tape drive, the tape cartridge transport magazines, and/or the single tape cartridge interface. In the instance where the tape drive component is implemented as a pair of stacked half-height tape drives, the cartridge picker can be elevated to access the second tape drive. The single tape cartridge interface is configured to receive individual tape cartridges from an operator so that the individual tape cartridge can either be stored in one of the cartridge transport magazines or presented to the tape drive for read/write operations and also eject an individual tape cartridge from the autoloader/library system to the operator.

The autoloader/library system is also configured to mechanically and electrically interconnect with other substantially identical autoloader/library systems by stacking multiple autoloader/library systems to provide expandability and scalability as a matter of design choice. Once stacked, the multiple autoloader/library systems could each include their own tape cartridge transport magazines, tape drive, and cartridge picker or could share elements such as tape cartridge transport magazines, tape drives and cartridge pickers. In addition, stacked autoloader/library systems can also share tape cartridges to provide efficient load balancing and operation.

A first advantage of the present autoloader/library system, is the use of transport mechanisms in the tape cartridge transport magazines to position tape cartridges for selection by the cartridge picker. Advantageously, this significantly limits the amount of travel for the cartridge picker to exchange tape cartridges between the tape drive, the magazines and the single cartridge interface. For example, in prior art systems, the robotic cartridge retrieval mechanism was required to move to the fixed location of a desired tape cartridge in a magazine, select the tape cartridge from the magazine, and the robotic cartridge retrieval mechanism then had to move to the location of the tape drive, which operations are time consuming and require the use of complex mechanisms to move the robotic cartridge retrieval mechanism. In contrast, in the autoloader/library system the cartridge picker simply rotates between the tape cartridge transport magazines, the tape drive and the single cartridge interface. Thus, the present autoloader/library system provides fast and efficient exchange of tape cartridges between the magazines, the single cartridge interface, and the tape drive. A second advantage of the present autoloader/library system is the use of the transport mechanisms in the magazines to provide a substantially smaller form factor by reducing the space required for operation of the cartridge picker. A third advantage of the present autoloader/library system is the storage of the tape cartridges in a horizontal relationship within the magazines to facilitate the substantially smaller form factor. A fourth advantage of the present autoloader/library system, is the expandability and scalability provided by stacking multiple autoloader/library systems to expand capacity. A fifth advantage of the autoloader/library system, is the accommodation of individual tape cartridges by the single cartridge interface without interrupting operation of the autoloader/library system. For example, the autoloader/library system can be inventorying the tape cartridges within the magazines, reading and writing data in the tape drive, and be shuttling tape cartridges between the single cartridge interface and the magazines. Additionally, during ejection from the single cartridge interface the tape cartridge is ejected far enough to prevent locking up of the cartridge picker. Finally, once ejected the tape cartridge cannot be reinserted without providing a control input, thus preventing damage to the cartridge picker by a reinsertion when the picker is performing another operation. A sixth advantage of the present autoloader/library system is that the compact form factor measures only three and one half inches in height and fits in a standard library rack mount both individually and when coupled with other similar autoloader/library systems.

DESCRIPTION OF THE DRAWINGS

FIG. 4 illustrates an example of the tape cartridge transport magazine transport mechanism according to the present invention;

DETAILED DESCRIPTION

Figure 1:
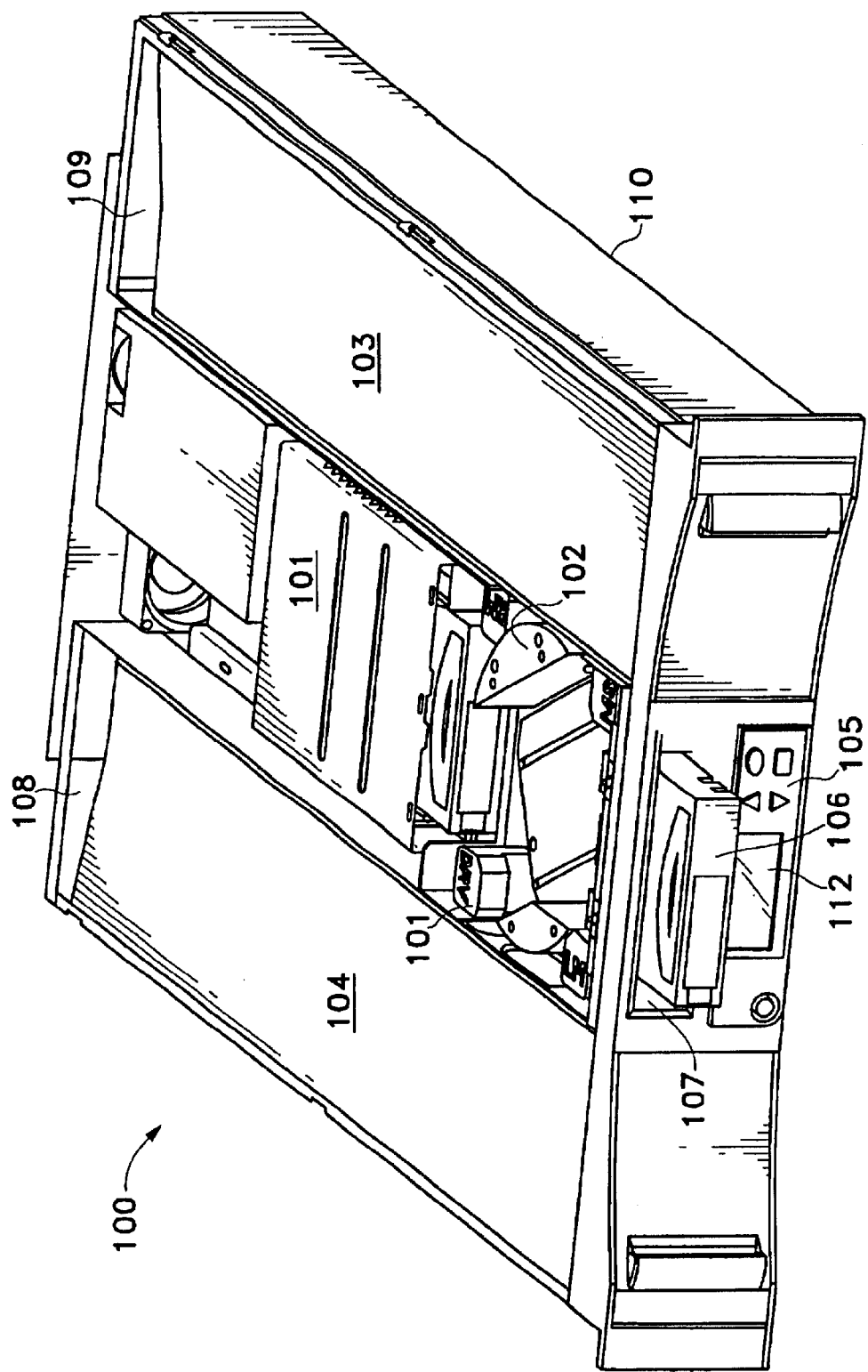
FIG. 1 illustrates an example of a tape cartridge library according to the present invention.

Automated Tape Cartridge Autoloader/Library System—FIG. 1

FIG. 1 depicts an automated tape cartridge autoloader/library system according to the present invention, namely automated autoloader/library system 100. The primary components of the autoloader/library system 100 are a read/write tape drive 101, a tape cartridge picker 102, a single tape cartridge interface 107, and a pair of tape cartridge transport magazines, 103 and 104, enclosed in a housing 110. The autoloader/library system 100 also comprises a control panel 105 that receives control inputs from an operator and includes a user interface 112 to provide status information to the operator.

The autoloader/library system 100 incorporates various features and aspects that improve over prior art tape cartridge libraries and autoloaders and provides a fully upgradable and scalable autoloader/library system in a compact and volumetrically efficient form factor. The autoloader/library system 100 is a complete tape cartridge library that stores, manages, and automatically exchanges a plurality of tape cartridges, e.g. 106, between the tape drive 101, the single cartridge interface 107, and the tape cartridge transport magazines, 103 and 104. Advantageously, the principals of the present autoloader/library system 100 could easily be applied to any tape cartridge media as a matter of design choice by simply incorporating the appropriate tape drive format into the autoloader/library system 100. Additionally, the autoloader/library system 100 could include multiple tape drives, e.g. 101, as a matter of design choice although only tape drive 101 is shown for clarity. Some examples of the tape cartridge media 106 include without limitation, DLT, LTO, 8 millimeter, and S-DLT tape cartridges.

Another advantage of the autoloader/library system 100 is the compact form factor. In one example of the present autoloader/library system 100, the housing 110 including the tape cartridge transport magazines, 103 and 104, the tape drive 101, the cartridge picker 102, and all control elements including motors, circuitry, and processors measures only 3.5 inches in height and fits in a standard rack mount. The storage and management of the plurality of tape cartridges in the compact form factor of the autoloader/library system 100 is provided by the cartridge picker 102 and the individual tape cartridge transport magazines, 103 and 104. The tape cartridge transport magazines, 103 and 104, are each configured to receive and store a plurality of individual tape cartridges, e.g. 106, in a plurality of individual tape cartridge storage locations. The cartridge picker 102 is configured to rotate to position the cartridge picker 102 to exchange the individual tape cartridges, e.g. 106, with one of the tape drive 101, the tape cartridge transport magazine 103, the tape cartridge transport magazine 104, and the single tape cartridge interface 107. The tape cartridge transport magazines, 103 and 104, are each configured to transport the tape cartridges within the tape cartridge transport magazines, 103 and 104, so that any one of the stored tape cartridges can be positioned for selection by the cartridge picker 102. Advantageously, the use of the transport mechanisms in the tape cartridge transport magazines, 103 and 104, to position tape cartridges, e.g. 106, for selection by the cartridge picker 102 significantly limits the travel required for the cartridge picker 102. For example, rather than move to the location of a desired tape cartridge 106 in the magazine 103, select the tape cartridge 106 from the magazine 103, and then move to the location of the tape drive 101, the cartridge picker 102 simply rotates between the tape cartridge transport magazine 103 and the tape drive 101. Similarly, the cartridge picker 102 rotates between the cartridge transport magazine 104, the single cartridge interface 107, and the tape drive 101. Thus, the present autoloader/library system 100 provides fast and efficient exchange of tape cartridges, e.g. 106, between the magazines, 103 and 104, the single cartridge interface 107, and the tape drive 101. Furthermore, the transport mechanisms in the tape cartridge transport magazines, 103 and 104, permit tape cartridge transport magazines, 103 and 104, the tape drive 101, the single cartridge interface 107, and the picker 102 to be coplanar further facilitating the compact form factor. Still yet another advantage of the present autoloader/library system 100, is that the tape cartridges, e.g. 106, are not flipped or re-oriented during transport within the tape cartridge transport magazines, 103 and 104 so the tape cartridges are always in the proper orientation for retrieval by the cartridge picker 102 and for presentation to the tape drive 101 single cartridge interface 107, and other tape cartridge magazine 104.

Once selected by the cartridge picker 102, the individual tape cartridge, e.g. 106, could be provided to one of the following locations depending on the desired operation to be performed. If a read/write operation is desired, the cartridge picker 102 could provide the selected tape cartridge 106 to the tape drive 101. If an ejection operation is desired, the cartridge picker 102 could provide the selected tape cartridge 106 to the single tape cartridge interface 107 for retrieval by an operator. If a load balancing operation is desired, the cartridge picker 102 could exchange tape cartridge 106 between tape cartridge transport magazine 103 and tape cartridge transport magazine 104. Finally, as will become apparent from the following description, the cartridge picker 102 could also provide the selected tape cartridge 106 to another tape cartridge transport magazine in another coupled tape cartridge autoloader/library system. Finally, the cartridge picker 102 could also provide the selected tape cartridge, e.g. 106, to another tape drive in the coupled tape cartridge autoloader/library system.

The Tape Cartridge Transport Magazine

Figure 2:
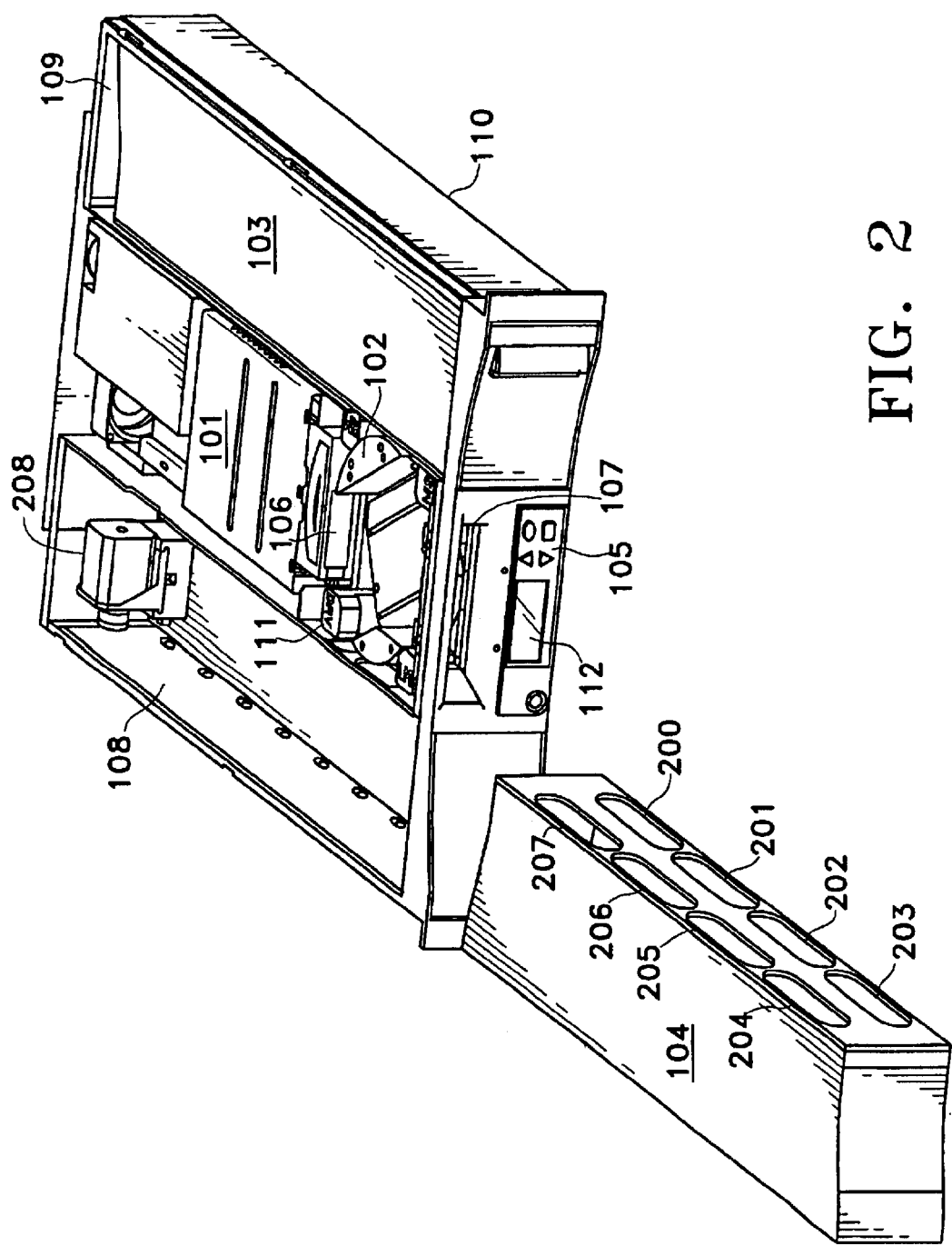
FIG. 2 illustrates an example of the tape cartridge library according to the present invention with the tape cartridge transport magazine in an ejected position.

FIG. 2 depicts the tape autoloader/library system 100 with the tape cartridge transport magazine 104 in the ejected position. The tape cartridge transport magazines, 103 and 104, are each designed to receive a plurality of tape cartridges, e.g. 106, in a plurality of storage locations 200–207. These storage locations 200–207 are "virtual" storage locations in that they are not physically delimited spaces within the tape cartridge transport magazines 103, 104, but are representative of the position of tape cartridges within the tape cartridge transport magazines 103, 104 when the tape cartridge transport magazines 103, 104 are equipped with a full complement of tape cartridges and these tape cartridges are in a "home" location. Therefore, the illustration of FIG. 2 is where eight cartridges are loaded in tape cartridge transport magazine 104 and oriented four cartridges in a top row, above the four cartridges below. The face of the tape cartridge transport magazine 104 shown in FIG. 2 where the storage locations 200–207 are displayed, may indeed have a cover plate in which is formed apertures that correspond to storage locations 200–207, or such a cover plate may simply be equipped with a single aperture located opposite the cartridge picker 102, since this is the cartridge retrieval location. The use of a single aperture may reduce the possibility of the introduction of environmental contaminants into the tape cartridge transport magazine 104, since this single aperture can be sealed by a slidable cover.

It should be noted that the tape cartridge transport magazines, 103 and 104, are depicted for the purpose of illustration and not limitation. Thus, while the tape cartridge transport magazines, 103 and 104, are shown with eight storage locations 200–207, the magazines, 103 and 104, could be configured with more or less than the eight storage locations 200–207 as a matter of design choice and type of tape media accommodated. Additionally, it is not necessary that both tape cartridge transport magazine 103 and tape cartridge transport magazine 104 include the same number of storage locations 200–207. Thus, one of the tape cartridge transport magazines, 103 and 104, could contain more or less storage locations than the other one of the tape cartridge transport magazine, 103 and 104. Finally, one of the tape cartridge transport magazines, 103 and 104, could be configured for one type of tape media, e.g. DLT tape media, while the other one of the tape cartridge transport magazines, 103 and 104, could be configured for another type of tape media, e.g. LTO tape media, where the individual autoloader libraries e.g. 100 are coupled. For example, one of the coupled autoloader/libraries could include a DLT tape drive, while the other autoloader/library includes an LTO tape drive.

The tape cartridge transport magazine 104 is configured to slidably interface with a magazine port 108 in the housing 110. The tape cartridge transport magazine 103 is configured to slidably interface with a magazine port 109 in the housing 110. In addition, the tape cartridge transport magazines, 103 and 104, are interchangeable. Thus, the tape cartridge transport magazine 104 also slidably interfaces with the magazine port 109 and the tape cartridge transport magazine 103 slidably interfaces with the magazine port 108. Alternatively, the cores of the tape cartridge transport magazines, 103 and 104, could be configured so as to be interchangeable as will become apparent from the following description. In this case the interchangeable cores would be configured for insertion in one of a left or right magazine housing that in turn slidably interfaces with the respective magazine port 108 and 109.

Figure 3:
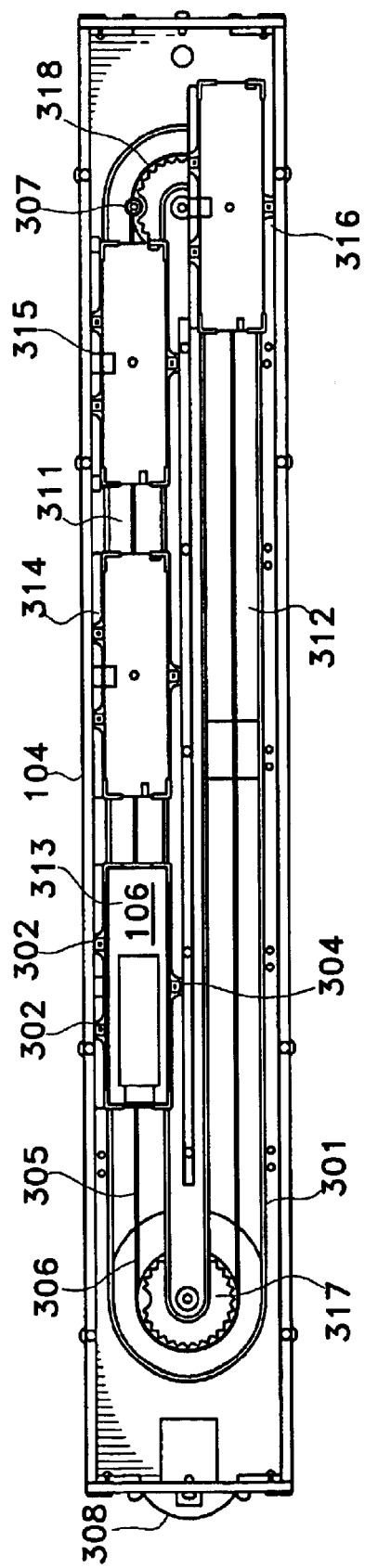
FIG. 3 illustrates an example of the tape cartridge transport magazine according to the present invention.

FIG. 3 depicts a partial perspective view of the interior of the tape cartridge transport magazine 104 used to illustrate the transportation of the tape cartridges within the tape cartridge transport magazines, 103 and 104. The plurality of tape cartridges are loaded into the tape cartridge transport magazines, 103 and 104, by sliding the individual tape cartridges, e.g. 106, into individual carriages, e.g. 313–316, in a horizontal relationship relative to the magazines, 103 and 104. On FIG. 3 only carriages 313–316 are shown for clarity. Additionally, carriages 314–316 are shown empty, while carriage 313 is shown with a tape cartridge 106.

The tape cartridge transport magazines, 103 and 104, are configured to transport the individual tape cartridges, e.g. 106, within the tape cartridge transport magazines, 103 and 104. The tape cartridges, e.g. 106, are transported in the magazines, 103 and 104, by rotating the carriages 313–316 to different storage locations 200–207 in an oval fashion as illustrated by FIG. 3.

Figure 4A:
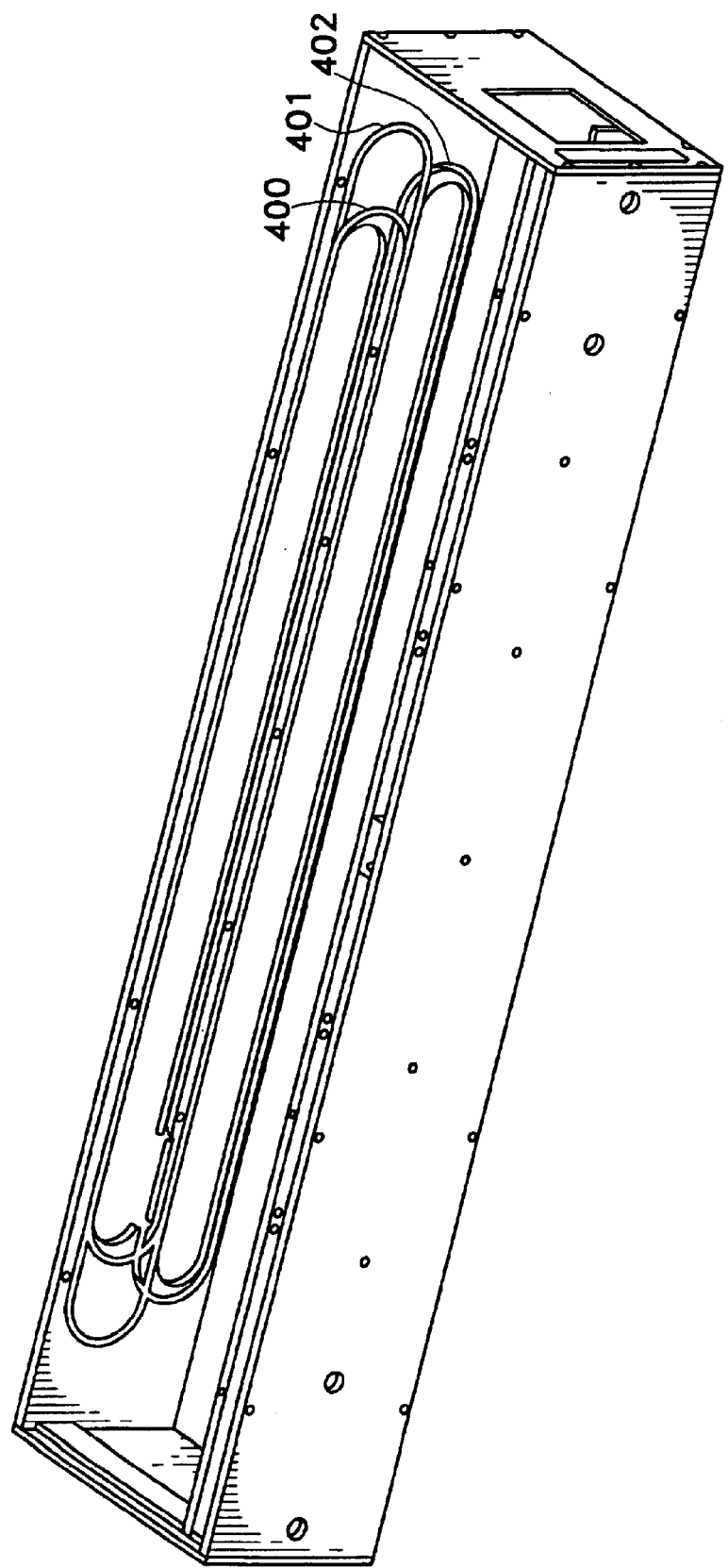
FIG. 4a illustrates additional details of the tape cartridge transport magazine transport mechanism according to the present.
Figure 4B:
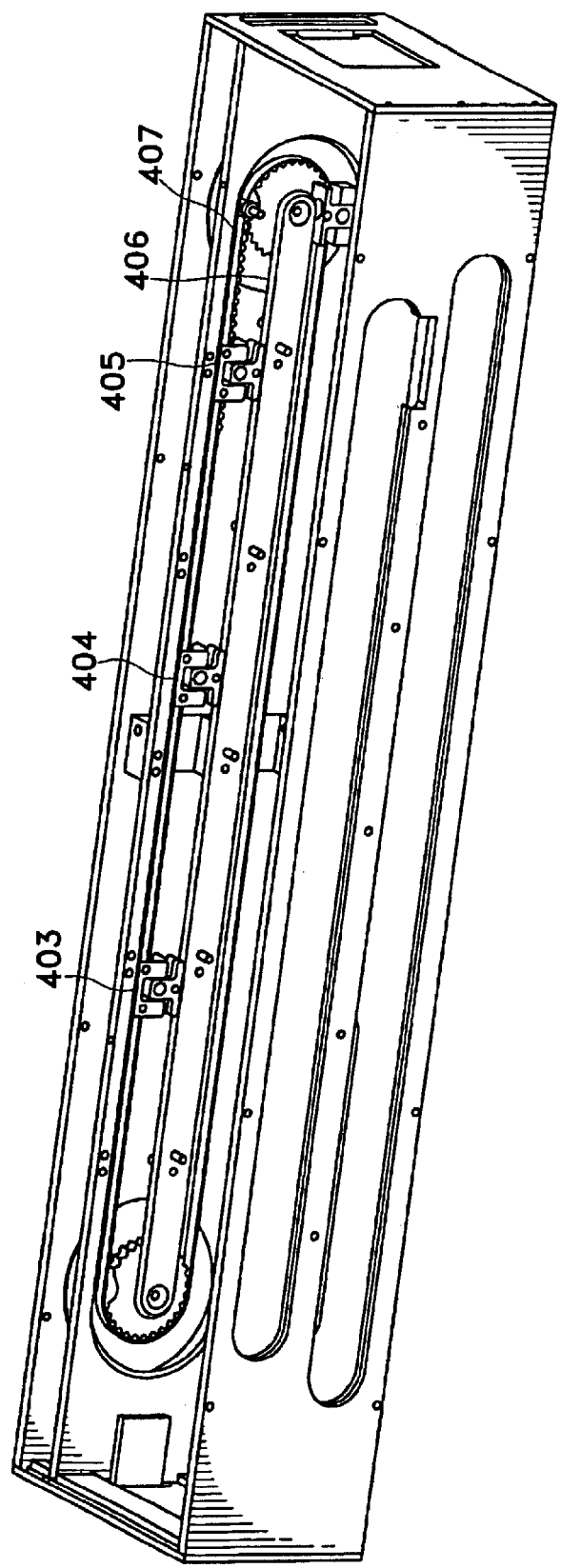
FIG. 4b illustrates additional details of the tape cartridge transport magazine transport mechanism according to the present.
Figure 5:
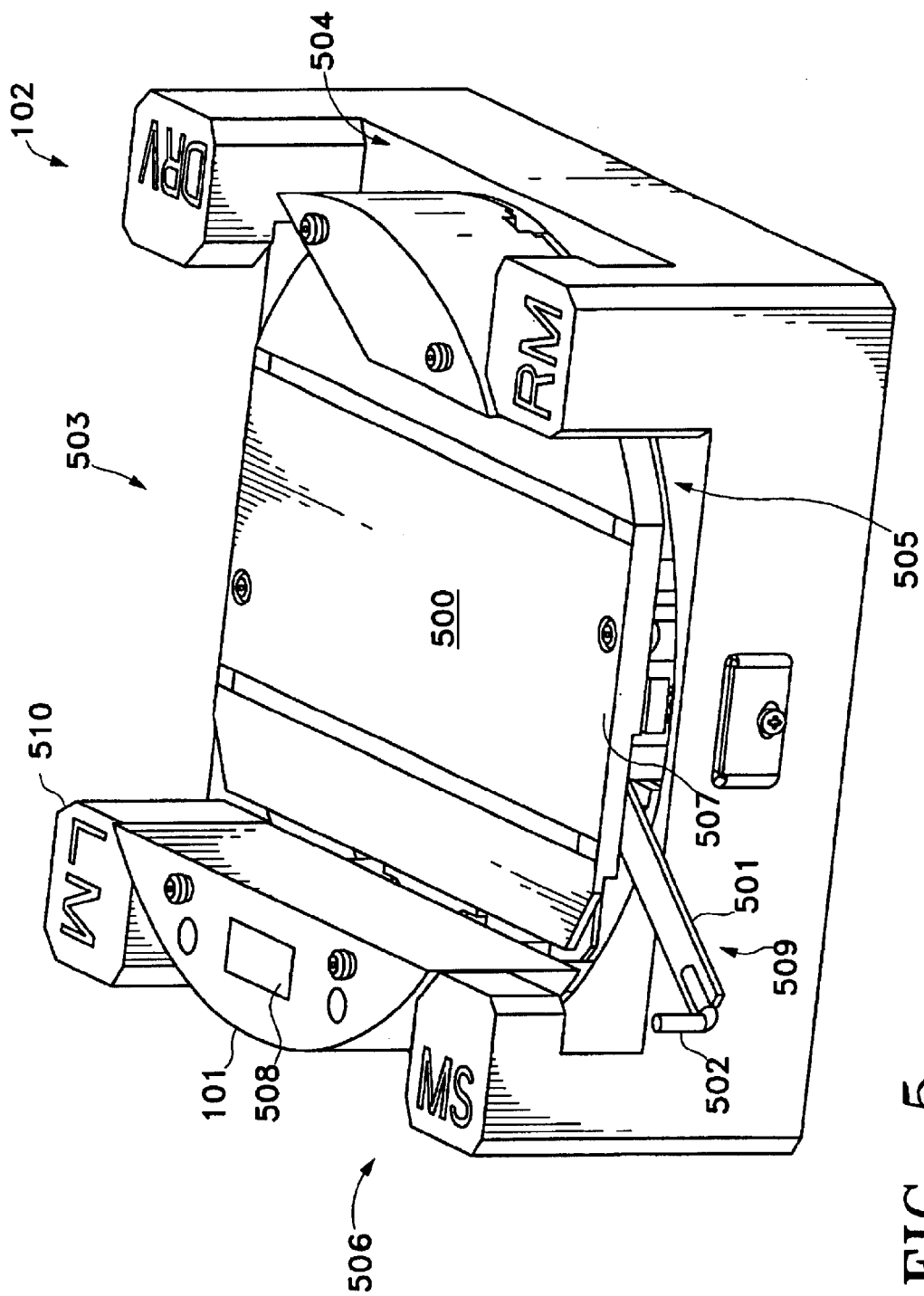
FIG. 5 illustrates an example of the cartridge picker according to the present invention.
Figure 6:
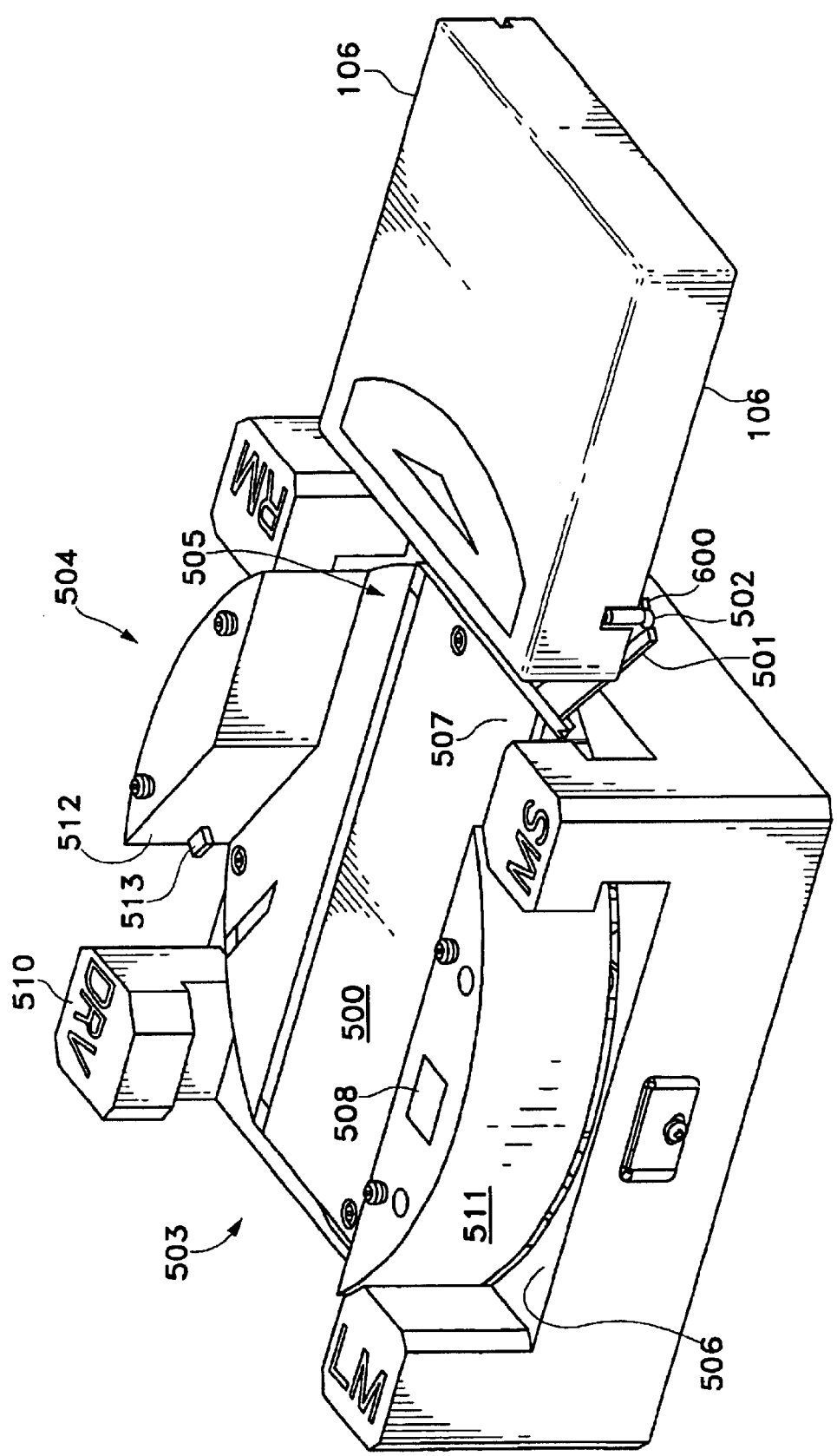
FIG. 6 illustrates an example of the cartridge picker with a selected tape cartridge according to the present invention.
Figure 7:
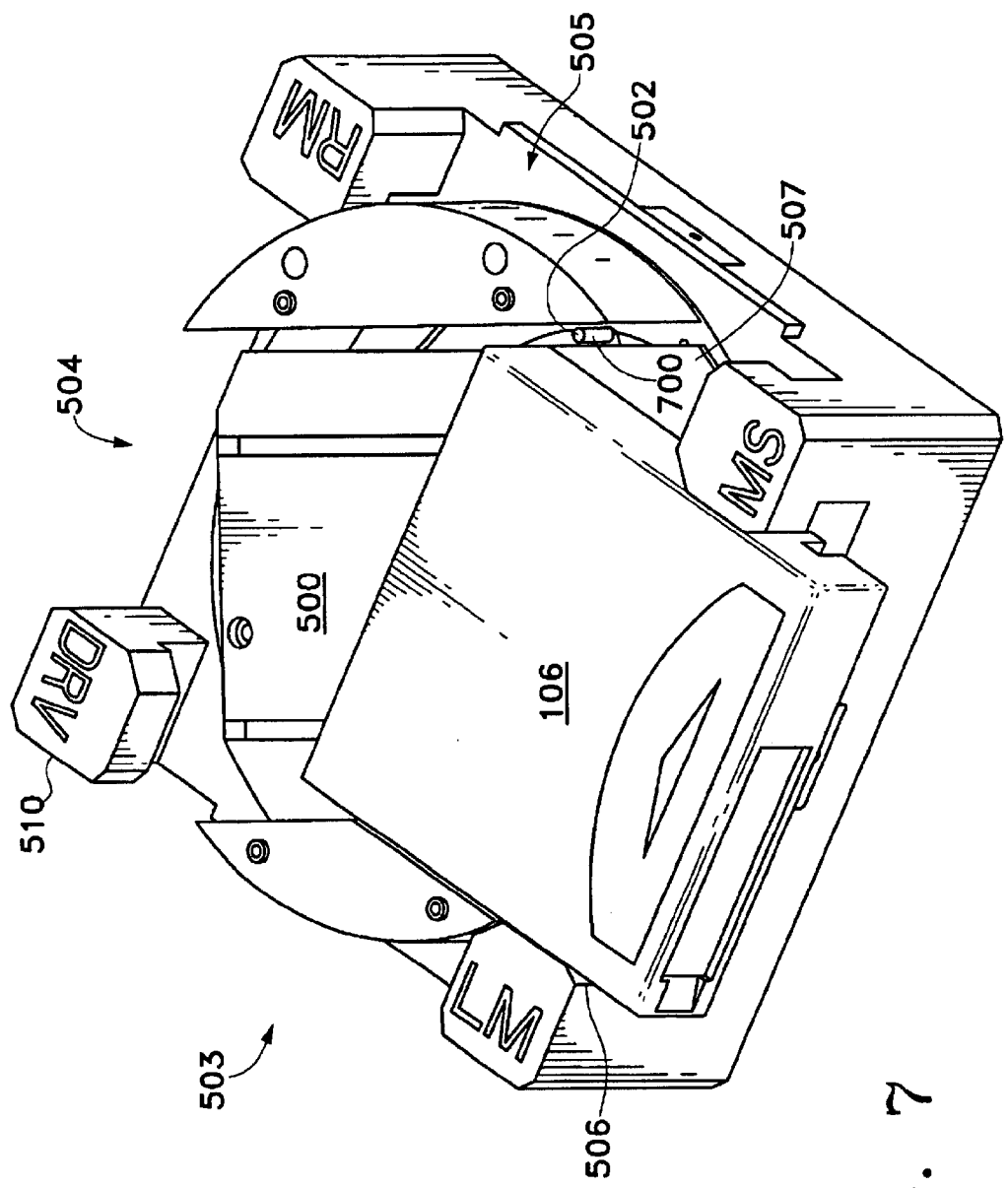
FIG. 7 illustrates another example of the cartridge picker with a selected tape cartridge according to the present invention.
Figure 8:
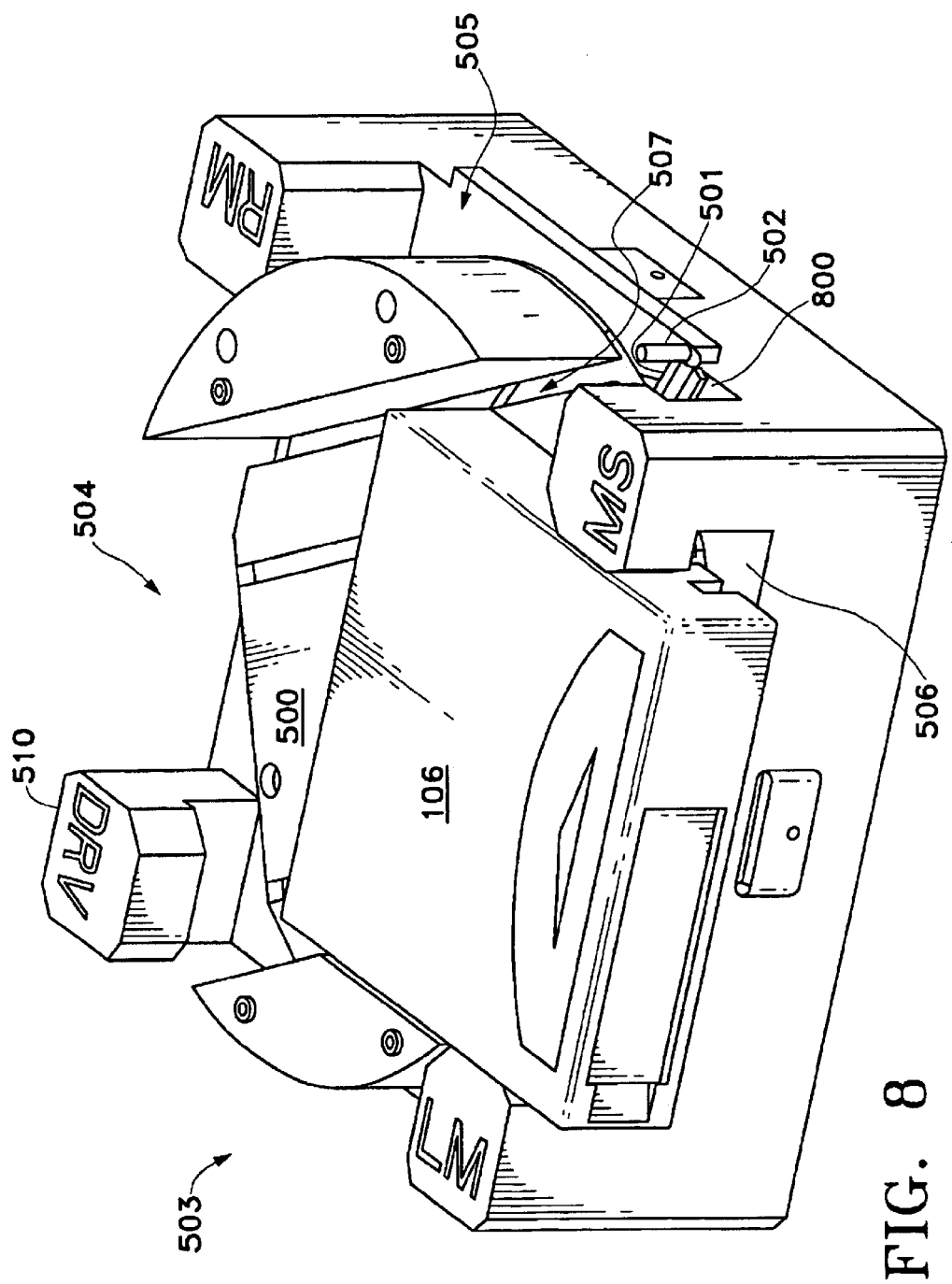
FIG. 8 illustrates another example of the cartridge picker with a selected tape cartridge according to the present invention.

Referring to FIGS. 2–4, tape cartridges, e.g. 106, are transported within the tape cartridge transport magazines, 103 and 104, using a motor driven transport system that moves carriages 313–316 to the different storage locations 200–207 within the tape cartridge transport magazine 104. The transport system comprises a belt 305 connected to each of the carriages 313–316. A drive gear 306 located in one end of the magazine 104 and a drive gear 307 located in the distal end of the magazine 104 function to rotate the belt 305 to transport the carriages 313–316. The belt 305 rides on a pulley 317 coupled to the drive gear 306 and a respective pulley 318 coupled to the drive gear 307. A motor 208, in the housing 110, powers a main drive gear 308 coupled to the drive gear 306. The motor 208 operates to drive the gears, 308 and 306, to move the belt driven carriages 313–316 in an ovular pattern through the magazine 104 as illustrated in FIG. 3. The motor 208 operates in both a forward and reverse direction. Advantageously, this permits the most efficient positioning of a tape cartridge, e.g. 106, for selection and retrieval by the cartridge picker 102. For example, referring to FIG. 2, if the desired tape cartridge is currently in the carriage 313 at the storage location 205, the transport operates in a counterclockwise direction to move the carriage 313 to the storage location 204 for retrieval by the cartridge picker 102. Similarly, if the desired tape cartridge is currently in the carriage 313 at the storage location 203, the transport operates in a clockwise direction to move the carriage 313 to the storage location 204 for retrieval by the cartridge picker 102. In this illustrated example, the tape cartridge transport magazine 104 is a passive mechanism, in that it is not powered internally by a motor. Optionally, the motor 208 can be located within tape cartridge transport magazine 104 and the motor 208 interconnects with electrical contacts located in the magazine port 108 when the tape cartridge transport magazine 104 is inserted therein.

The carriages 313–316 each include wheels, e.g. wheels 302, 303 and 304, on the carriage 313 that ride in a respective track 400–402. In addition, a wheeled assembly, e.g. 403–405, is connected to the backside of each carriage, e.g. 313 and rides between tracks 406 and 407 to provide further support for the carriage, e.g. 313 during transport. When the motor 208 is powered, the carriages 313–316 travel along a top portion 311 of the tape cartridge transport magazine 104 until they are passed to a bottom portion 312 of the tape cartridge transport magazine 104. Tracks 400–402 are separated and configured to pass the individual carriages, e.g. 313, from the top-portion 311 to the bottom portion 312 without changing the orientation of the carriage 313. The wheeled assemblies 403–406 rotate as the individual carriages, e.g. 313, are passed from the top portion 311 to the bottom portion 312 to provide a substantially continuos point of contact for the carriage 313. Thus, as the carriage 313, containing the tape cartridge 106, is passed from the top portion 311 to the bottom portion 312, the orientation of the tape cartridge 106 relative to the carriage 313 and the magazine 104 does not change. One skilled in the art will appreciate that during the transfer of a carriage, e.g. 313, from the top portion 311 to the bottom portion 312, it is preferable to maintain contact between at least two of the wheels 302, 303, and 304 and two of the tracks 300, 309 and 310. Advantageously, the transportation of the carriages 313–316 within the magazines, 103 and 104, permits any one of the individual carriages 313–316 and corresponding tape cartridge, e.g. 106, to be positioned at any one of the storage locations 200–207.

The Cartridge Picker

FIGS. 5–8 depict various perspective views of the cartridge picker 102. The cartridge picker 102 comprises a turntable 500 rotatably connected to a stationary picker base 510. The turntable 500 comprises a cartridge interface 507 and a translation arm 501 having a perpendicular cartridge pin 502 at one end. The cartridge picker 102 also comprises a bar code reader 508 for reading computer readable indicia on the plurality of tape cartridges. Advantageously since the cartridge picker 102 rotates, those skilled in the art will appreciate the bar code reader could be located at numerous other locations on the cartridge picker 102 as a matter of design choice.

The picker base 510 is a stationary base member defining four cartridge exchange ports 503, 504, 505, and 506. Operationally, the turntable 500 rotates to align the cartridge interface 507 with one of the cartridge exchange ports 503–506 to exchange tape cartridges, e.g. 106, with the tape cartridge transport magazine 104, the tape drive 101, the tape cartridge transport magazine 103, and the single cartridge interface 107. Specifically, the cartridge interface 507 aligns with the cartridge exchange port 503 when the turntable 500 is rotated to exchange the tape cartridge 106 with the tape cartridge transport magazine 103. The cartridge interface 507 aligns with the cartridge exchange port 504 when the turntable 500 is rotated to exchange the tape cartridge 106 with the tape drive 101. The cartridge interface 507 aligns with the cartridge exchange port 505 when the turntable 500 is rotated to exchange the tape cartridge 106 with the tape cartridge transport magazine 104. The cartridge interface 507 aligns with the cartridge exchange port 506 when the turntable 500 is rotated to exchange the tape cartridge 106 with the single cartridge interface 107.

Two motors control operation of the cartridge picker 102. A first motor rotates a spur gear coupled to a ring gear to rotate the turntable 500. A second motor and lead screw operate to extend and retract the translation arm 501 to retrieve the tape cartridge 106 from one of the tape cartridge transport magazine 104, the tape drive 101, the tape cartridge transport magazine 103, and the single cartridge interface 107. The translation arm 501 has three primary positions. The translation arm 501 is in the first position 700, illustrated by FIG. 7, when the tape translation arm 501 is retracted so that the turntable 500 is free to rotate (if the tape cartridge were not placed in the exchange port 506). The translation arm 501 is in the second position 509, illustrated by FIG. 5, when the translation arm 501 is fully extended and ready to select a tape cartridge, e.g. 106, from one of the tape cartridge transport magazines, 103 and 104, and the tape drive 101. The translation arm 501 is in the third position 800, illustrated by FIG. 8, when the translation arm 501 is fully extended backward to receive the tape cartridge 106 from the single cartridge interface 107.

The turntable 500 has four on-axis angular positions and four off-axis angular positions. The first on-axis angular position is when the turntable 500 is aligned with exchange port 503 to exchange the tape cartridge 106 with the tape cartridge transport magazine 103. The second on-axis angular position is when the turntable 500 is aligned with exchange port 505 to exchange the tape cartridge 106 with the tape cartridge transport magazine 104. The third on-axis angular position is when the turntable 500 is aligned with exchange port 504 to exchange the tape cartridge 106 with the tape drive 101. The fourth on-axis angular position is when the turntable 500 is aligned with the exchange port 506 to exchange the tape cartridge 106 with the single cartridge interface 107.

The first off-axis angular position is when the turntable 500 is at an approximate seven-degree rotation off of the first on-axis position. The first off-axis position permits the translation arm 501 to clear the tape cartridge 106, and engage and/or disengage the cartridge notch 600 to retrieve and/or load from the magazine 103. The second off-axis angular position is when the turntable 500 is at an approximate seven degree rotation off of the second on-axis position. The second off-axis position permits the translation arm 501 to clear the tape cartridge 106, and engage and/or disengage the cartridge notch 600 to retrieve and/or load from the magazine 104. The third off-axis angular position is when the turntable 500 is at an approximate seven degree rotation off of the third on-axis position. The third off-axis position permits the translation arm 501 to clear the tape cartridge 106, and engage and/or disengage the cartridge notch 600 to retrieve and/or load from the tape drive 101. The fourth off-axis angular position is when the turntable 500 is approximately at a thirty degree rotation off of the fourth on-axis position. The fourth off-axis position permits the translation arm 501 to clear the tape cartridge 106 and receive the tape cartridge 106 from the single cartridge interface 107.

The walls 510 and 511 are configured to receive the tape cartridge 106 on the turntable 500. The wall 510 is also configured with an angled portion 512. The portion 512 is configured with an angle of approximately thirty degrees to permit the turntable 500 to be rotated to the fourth off-axis position and receive the tape cartridge 106 from the single cartridge interface 107. It should be noted that the thirty degree angle of portion 512 also permits the turntable 500 to be rotated to the other approximate seven degree off-axis positions as well. Those skilled in the art will appreciate that other angles could be used to accommodate the different sizes of the various tape media accommodated by the present autoloader/library system 100. Additionally, the portion 512 includes a key 513 to prevent a tape cartridge from being inserted into the single cartridge interface 107 in the wrong orientation. Advantageously, the key 513 prevents the cartridge picker from accepting the tape cartridge 106 and presenting the tape cartridge 106 to one of the magazines, 103 and 104 or the tape drive 101 in the wrong orientation by preventing the tape cartridge 106 from being substantially inserted into the single cartridge interface 107.

Tape Library Operation FIGS. 9–14

Figure 9:
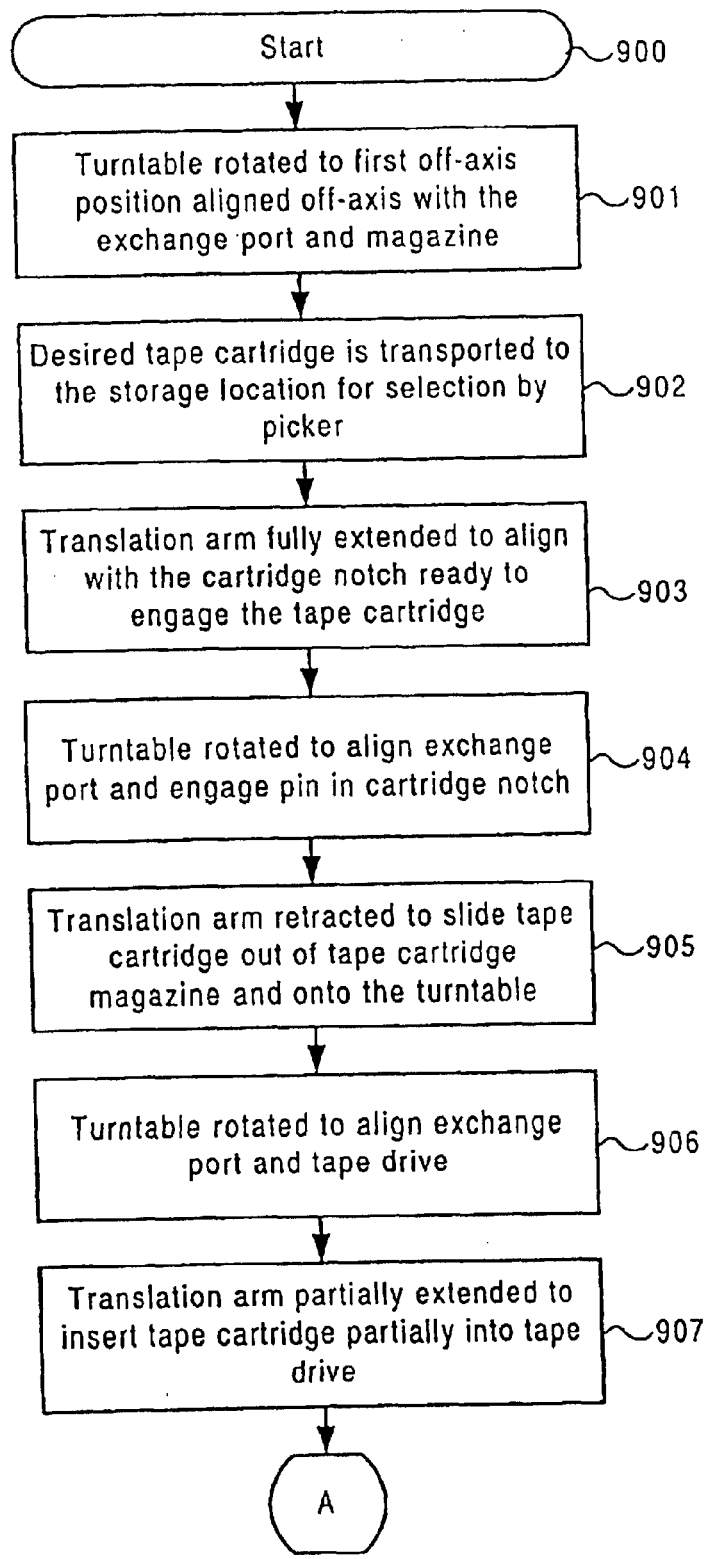
FIGS. 9 and 10 are a flow chart illustrating an example of the operation of the tape cartridge library according to the present invention.
Figure 10:
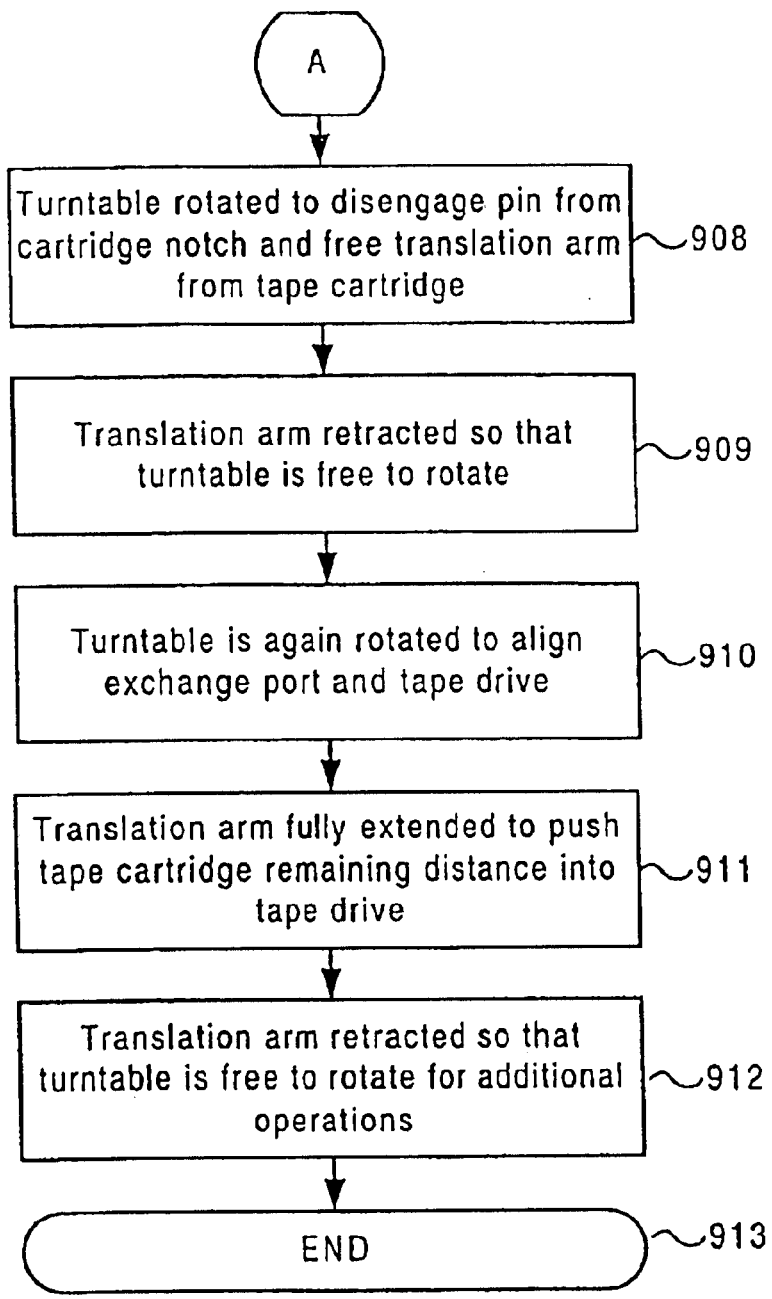

FIGS. 9 and 10 are a flow chart illustrating the operation of the cartridge picker 102 in retrieving a tape cartridge, e.g. 106, from the tape cartridge transport magazine 103. When a tape cartridge transport magazine, 103 or 104, is inserted into the autoloader/library system 100, the autoloader/library system 100 performs an inventory operation using sensors to determine which carriages, e.g. 313–316, contain tape cartridges and which carriages are empty. Thus, the autoloader/library system 100 automatically maintains an inventory of loaded tape cartridges during operation. The autoloader/library system 100 also maintains data indicative of the location of the tape cartridges and carriages within the magazines 103 and 104 so that a desired tape cartridge can be provided to the cartridge picker 102.

On FIG. 9 the operation begins at step 900. At step 901, the turntable 500 is rotated to the first off-axis position so that it is aligned off-axis with the exchange port 503 facing the tape cartridge transport magazine 103. Substantially simultaneously, the motor 208 is powered to transport the carriage containing the desired tape cartridge 106 to the storage location 204 for selection by the cartridge picker 102, at step 902. At step 903, the translation arm 501 is extended to the second position so that it is aligned with the cartridge notch 600 and is ready to engage the tape cartridge 106. At step 904, the turntable 500 is rotated to the first on-axis position to align with the exchange port 503 and thereby engage or seat the pin 502 in the cartridge notch 600. At step 905, the translation arm 501 is retracted to slide the tape cartridge 106 out of the tape cartridge transport magazine 103 and onto the turntable 500. At step 906, the turntable 500 is rotated to the third on-axis position to align the tape cartridge 106 that is located in the exchange port 504 with the tape drive 101. At step 907, the translation arm 501 is partially extended to insert the tape cartridge 106 partially into the tape drive 101. Those skilled in the art will appreciate that the tape cartridge 106 is only partially inserted to prevent the translation arm 501 from contacting the tape drive 101 during insertion. At step 908, the turntable 500 is rotated to the third off-axis position to disengage the pin 502 from the cartridge notch 600 and free the translation arm 501 from the tape cartridge 106. At step 909, the translation arm is retracted so that the turntable 500 is free to rotate. At step 910, the turntable 500 is again rotated to the third on-axis position to align the exchange port 504 with the tape drive 101. At step 911, the translation arm 501 is again fully extended to the second position to push the tape cartridge 106 the remaining distance into the tape drive 101 so that it is fully inserted for read/write operation. At step 912, the translation arm 501 is retracted so that the turntable 500 is free to rotate for additional operations. The operation ends at step 913. Those skilled in the art will appreciate that the operation would be substantially similar for retrieving a tape cartridge, e.g. 106 from the tape cartridge transport magazine 104, except that rotation positions of the cartridge picker 102 would be relative to the tape cartridge transport magazine 104.

Figure 11:
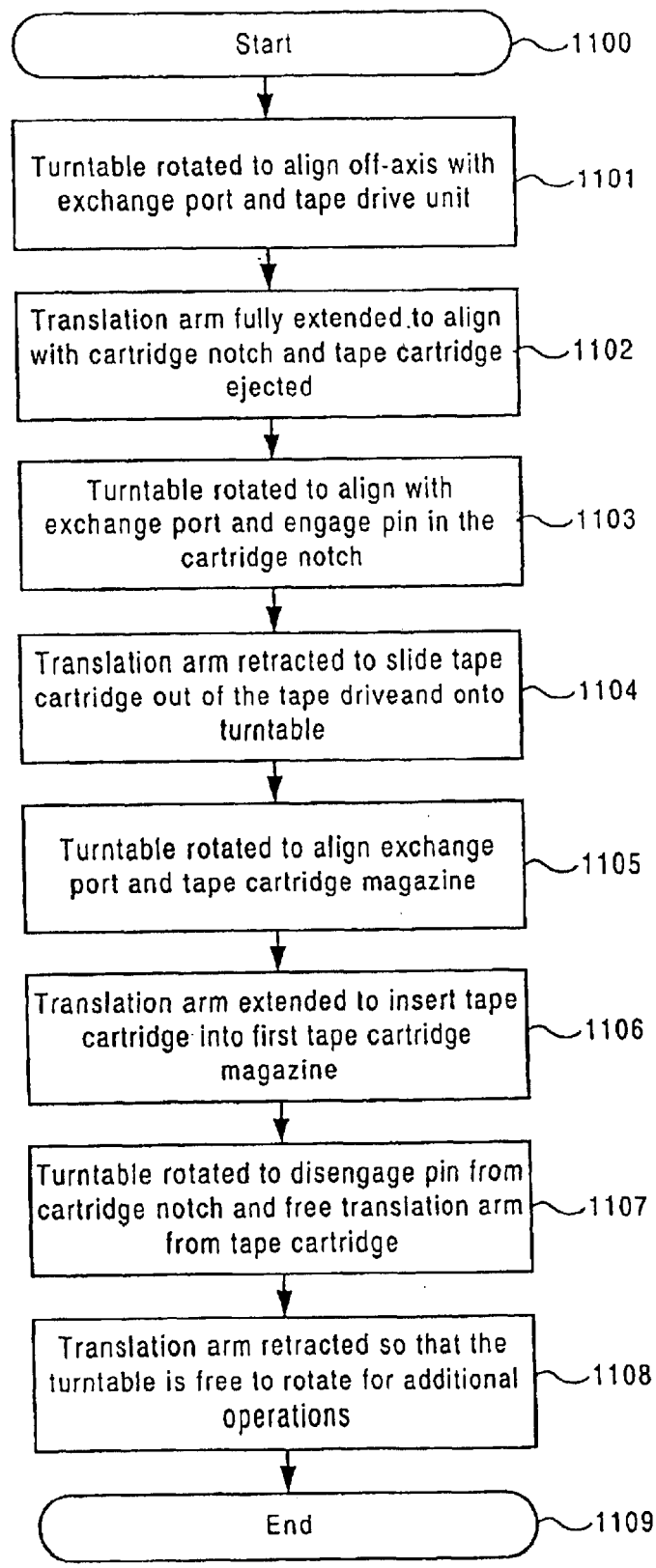
FIG. 11 is a flow chart illustrating another example of the operation of the tape cartridge library according to the present invention.

FIG. 11 is a flow chart illustrating the operation of the cartridge picker 102 unloading a tape cartridge 106 from the tape drive 101. On FIG. 11 the operation begins at step 1100. At step 1101, the turntable 500 is rotated to the third minor off-axis position so that the cartridge interface 507 is aligned off-axis with the exchange port 504 being located opposite the tape drive 101. At step 1102, the translation arm 501 is extended so that it is aligned with the cartridge notch 600 ready to engage the tape cartridge 106 and the tape cartridge 106 is ejected from the tape drive 101. At step 1103, the turntable 500 is rotated to the third on-axis position to align the cartridge interface 507 with the exchange port 504 and engage the pin 502 in the cartridge notch 600. At step 1104, the translation arm 501 is retracted to slide the tape cartridge 106 out of the tape drive 101 and onto the turntable 500. At step 1105, the turntable 500 is rotated to first on-axis position to align cartridge interface 507 with the exchange port 503 and the tape cartridge transport magazine 103. At step 1106, the translation arm 501 is extended to the second position to insert the tape cartridge 106 into the carriage at the storage location 204 in the tape cartridge transport magazine 103. At step 1107, the turntable 500 is rotated to the first off-axis angular position to disengage the pin 502 from the cartridge notch 600 and free the translation arm 501 from the tape cartridge 106. At step 1108, the translation arm 501 is retracted to without the tape cartridge 106 that the turntable 500 is free to rotate for additional operations. The operation ends at step 1109.

Figure 12:
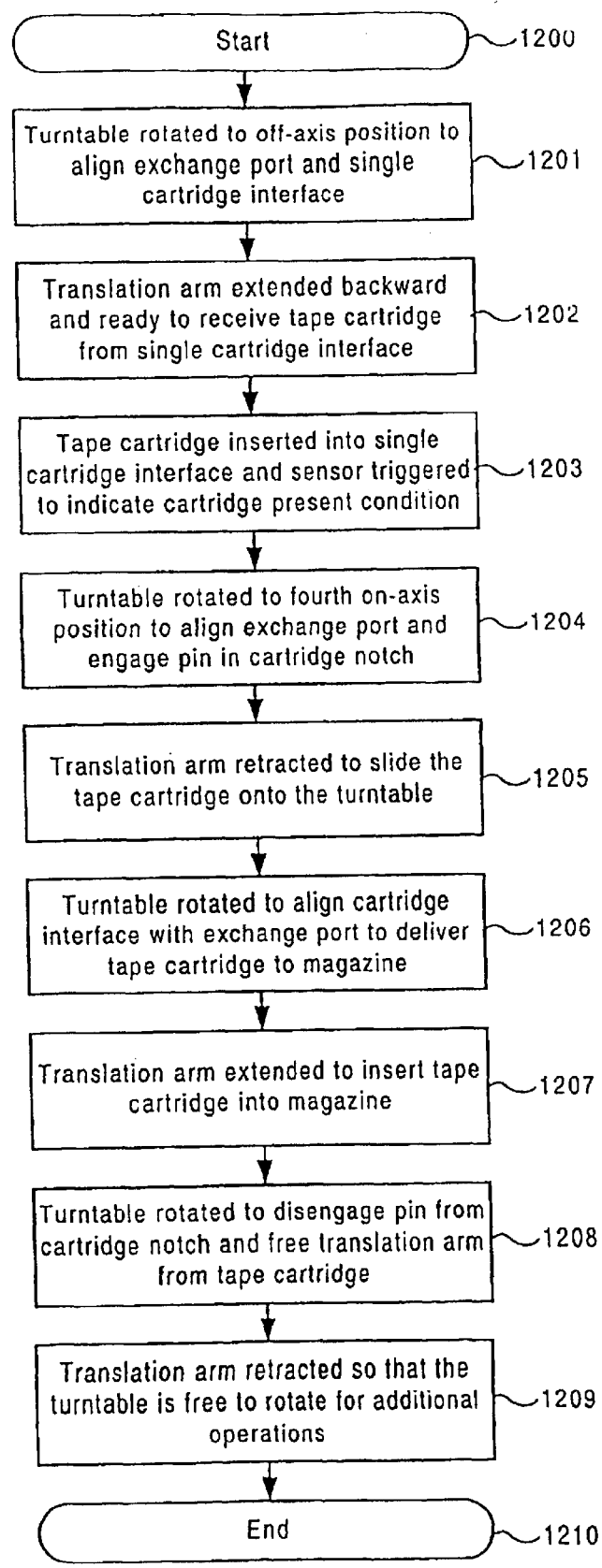
FIG. 12 is a flow chart illustrating another example of the operation of the tape cartridge library according to the present invention.

FIG. 12 is a flow chart illustrating the operation of the cartridge picker 102 in retrieving a tape cartridge 106 from the single cartridge interface 107. On FIG. 12 the operation begins at step 1200. At step 1201, the turntable 500 is rotated to the fourth off-axis position so that the cartridge interface 507 is aligned off-axis with the exchange port 506 being aligned with the single cartridge interface 107. At step 1202, the translation arm 501 is extended backward to position 800 so that it is ready to receive the tape cartridge 106 from the single cartridge interface 107. At step 1203, the tape cartridge 106 is inserted into the single cartridge interface 107 and a sensor is triggered to indicate a cartridge present condition. At step 1204, the turntable 500 is rotated to the fourth on-axis position to align the cartridge interface 507 with the exchange port 506 and engage the pin 502 in the cartridge notch 600. At step 1205, the translation arm 501 is retracted to the first position to slide the tape cartridge 106 onto the turntable 500. At step 1206, the turntable 500 is rotated to one of the first, second, or third on-axis positions to align cartridge interface 507 with one of the exchange ports 503, 504, or 505 and deliver the tape cartridge 106 to one of the tape cartridge transport magazines, 103 and 104, or the tape drive 101. In this case, the turntable 500 is rotated to the first on-axis angular position to deliver the tape cartridge 106 to tape cartridge transport magazine 103. At step 1207, the translation arm 501 is extended to the second position to insert the tape cartridge 106 into the tape cartridge transport magazine 103. At step 1208, the turntable 500 is rotated to the first off-axis position to disengage the pin 502 from the cartridge notch 600 and free the translation arm 501 from the tape cartridge 106. At step 1209, the translation arm 501 is retracted to the first position without the tape cartridge 106 so that the turntable 500 is free to rotate for additional operations. The operation ends at step 1210.

Figure 13:
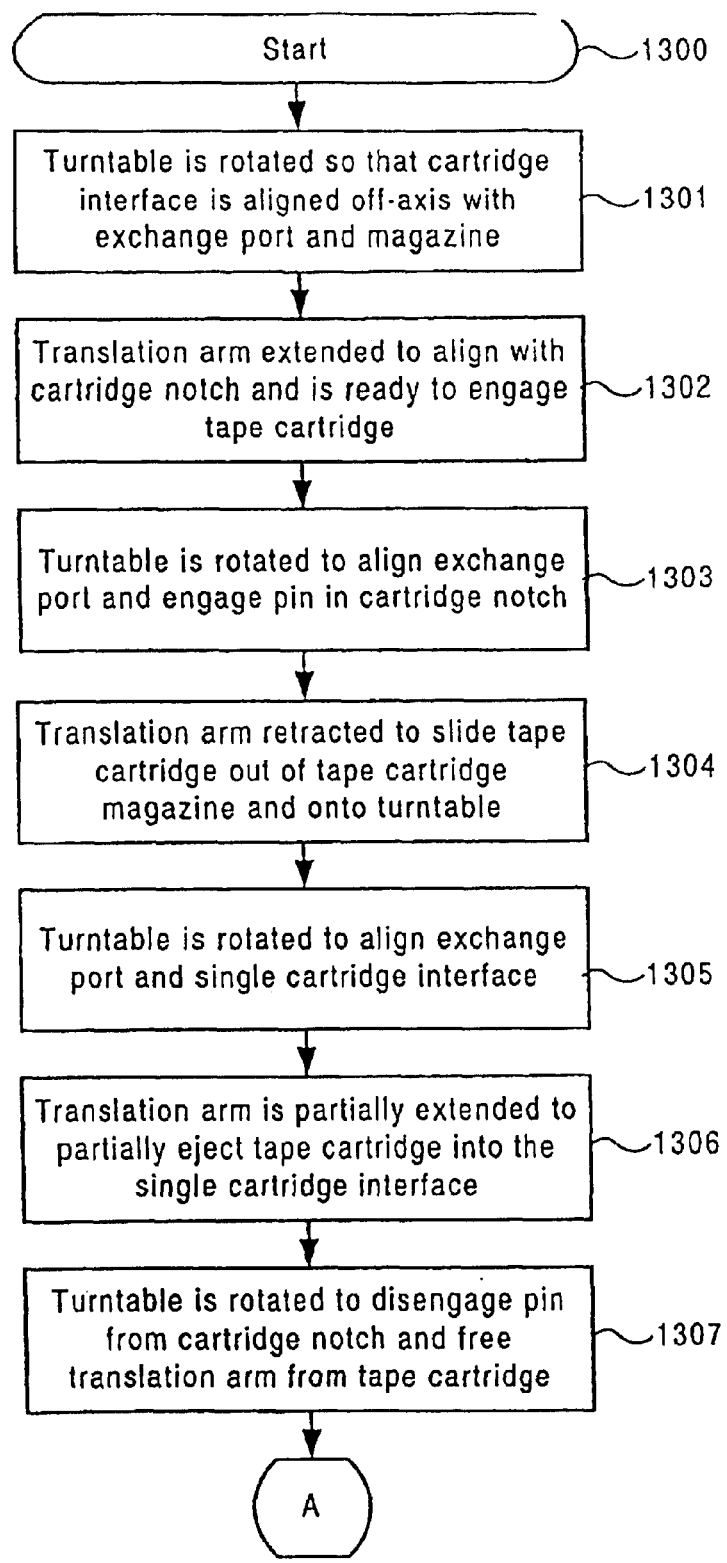
FIGS. 13 and 14 are a flow chart illustrating another example of the operation of the tape cartridge library according to the present invention.
Figure 14:
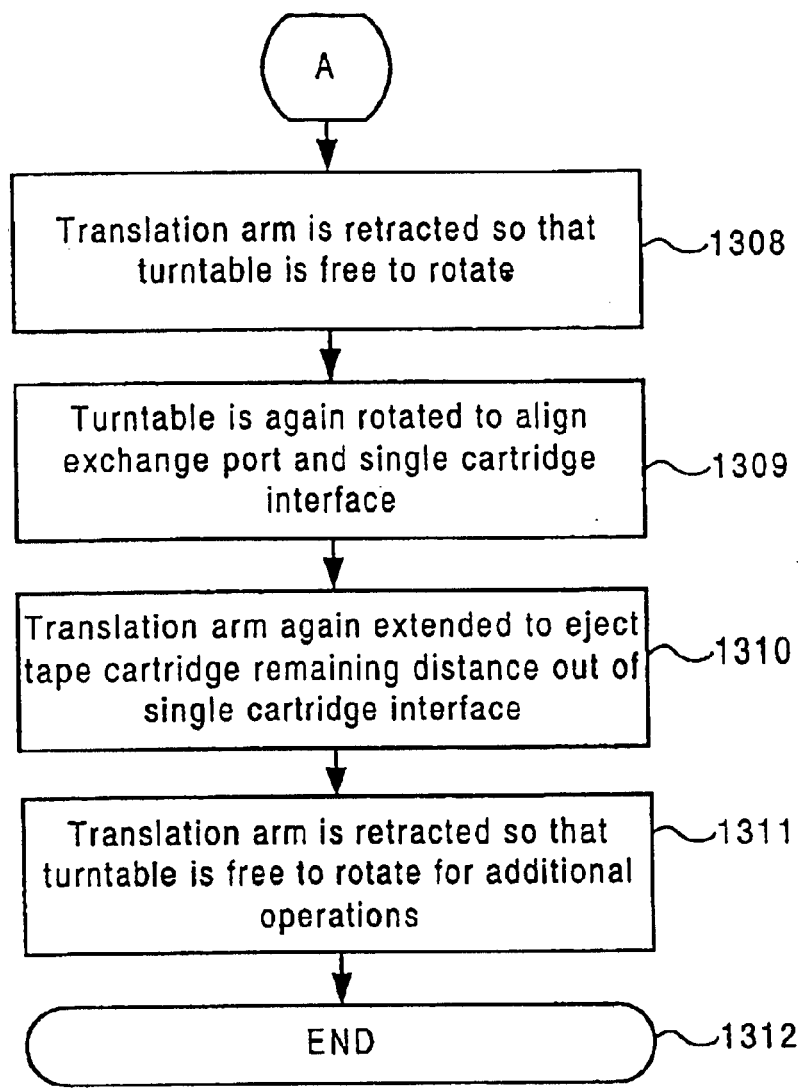

FIG. 13 is a flow chart illustrating the operation of the cartridge picker 102 in ejecting a tape cartridge 106 out of the single cartridge interface 107. In this example, the tape cartridge 106 is retrieved from the tape cartridge transport magazine 103. It should be noted that the operation would be similar for a tape cartridge retrieved from the tape drive 101 and the tape cartridge transport magazine 104 except that rotation positions of the cartridge picker 102 would be relative to the tape drive 101 or the tape cartridge transport magazine 104 respectively.

On FIG. 13 the operation begins at step 1300. At step 1301, the turntable 500 is rotated to the first off-axis position so that the cartridge interface 507 is aligned off-axis with the exchange port 503 being located opposite the tape cartridge transport magazine 103. At step 1302, the translation arm 501 is extended to the second position so that it is aligned with the cartridge notch 600 and is ready to engage the tape cartridge 106. At step 1303, the turntable 500 is rotated to the first on-axis position to align with the exchange port 503 and engage the pin 502 in the cartridge notch 600. At step 1304, the translation arm 501 is retracted to slide the tape cartridge 106 out of the tape cartridge transport magazine 103 and onto the turntable 500. At step 1305, the turntable 500 is rotated to the fourth on-axis position to align with the exchange port 506 and the single cartridge interface 107. At step 1306, the translation arm 501 is partially extended to partially eject the tape cartridge 106 into the single cartridge interface 107. At step 1307, the turntable 500 is rotated to the fourth off-axis position to disengage the pin 502 from the cartridge notch 600 and free the translation arm 501 from the tape cartridge 106. At step 1308, the translation arm 501 is retracted so that the turntable 500 is free to rotate. At step 1309, the turntable 500 is again rotated to the fourth on-axis position to align the exchange port 506 and the single cartridge interface 107. At step 1310, the translation arm 501 is again extended to eject the tape cartridge 106 the remaining distance out of the single cartridge interface 107. Advantageously, in the fully ejected position, the tape cartridge 106 does not interfere with the operation of the cartridge picker 102. At step 1311, the translation arm 501 is retracted so that the turntable 500 is free to rotate for additional operations. The operation ends at step 1312.

Figure 15:
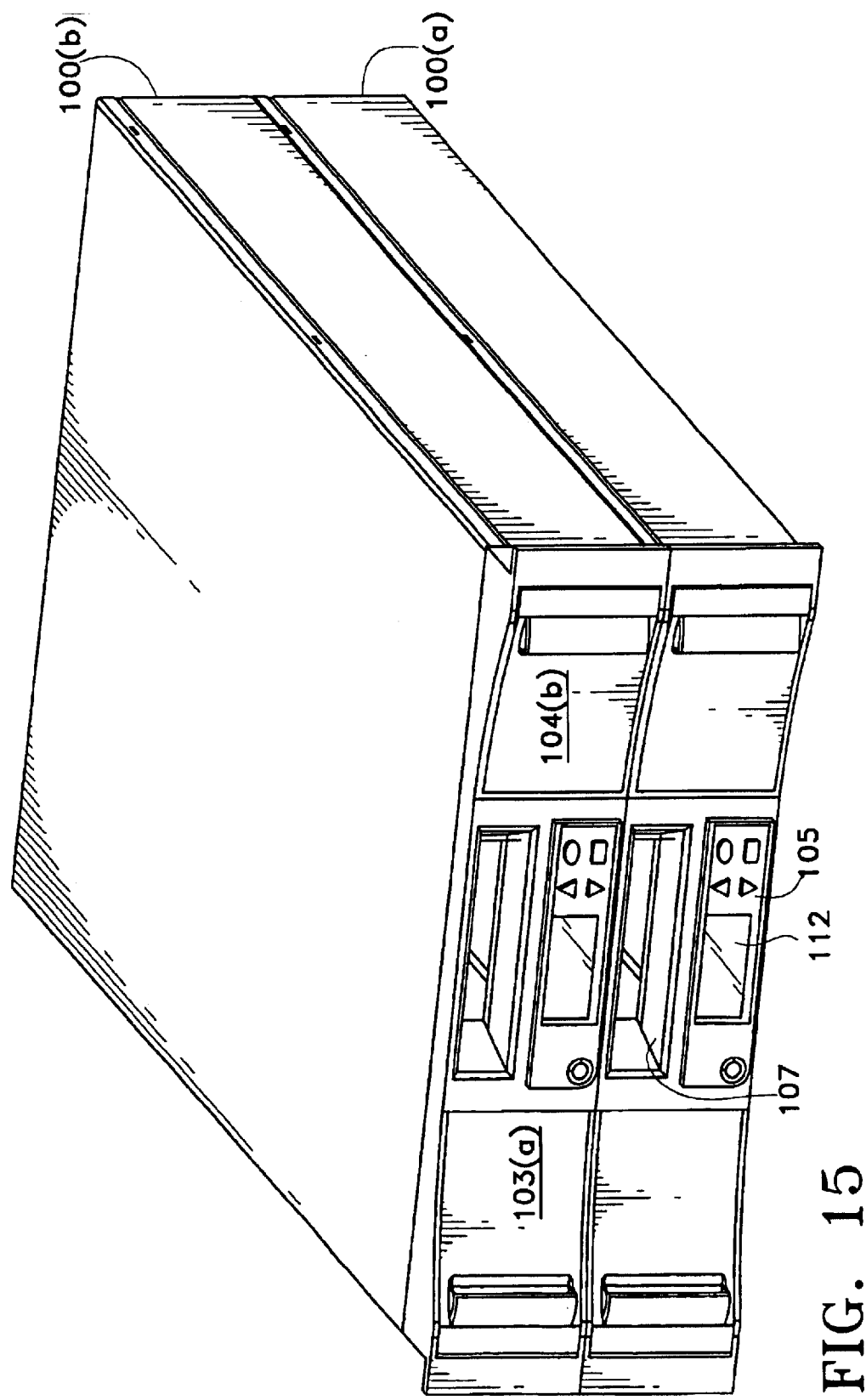
FIG. 15 illustrates a stacked configuration of the autoloader/library system according to the present invention.

Expansion of Tape Autoloader/library Systems FIG. 15

FIG. 15 illustrates multiple autoloader library systems in a stacked configuration. Those skilled in the art will appreciate that an infinite number of autoloader library systems could be stacked although only library systems 100(a) and 100(b) are shown on FIG. 15 for clarity.

The autoloader/library system 100 is configured to mechanically and electrically interconnect with other substantially identical autoloader/library systems by stacking multiple autoloader/library systems to provide expandability and scalability as a matter of design choice. Once coupled, the multiple autoloader/library systems 100(a) and 100(b) can share individual tape cartridges, e.g. 106, to provide efficient load balancing and performance between the coupled autoloader/library systems. The coupled autoloader/library systems 100(a) and 100(b) could each include a cartridge picker 102, tape cartridge transport magazines, 103 and 104, a tape drive 101, and a single cartridge interface 107, or could share some elements such as the cartridge picker 102, the single cartridge interface and/or the tape drive 101. In addition, the coupled autoloader/library systems 100(a) and 100(b) could each include an individual control panel 105 and interface 112 or could share a single control panel, e.g. 105, and interface, e.g. 112. In the case where the library systems e.g. 100 are coupled, the cartridge picker 102 is configured to not only rotate but is also configured to elevate within the multiple library systems, 100(a) and 100(b), to access magazines, 103(a) and 104(b).

In another example of the present invention, the library systems, 100(a) and 100(b), could share the single cartridge interface 107. In this case the single cartridge interface 107 is configured with an elevator mechanism to transport the single cartridge interface 107 in the vertical direction between the multiple library systems, 100(a) and 100(b). Operationally, the cartridge picker 102 in the system 100(a) could pass tape cartridges to the single cartridge interface 107. The single cartridge interface 107 then elevates to the system 100(b) where the tape cartridge is automatically passed to a cartridge picker, e.g. 102, in the system 100(b). The cartridge picker in the system 100(b) could then exchange the tape cartridge with the tape drive, e.g. 101 or the magazines, 103(a) and 103(b), in the system 100(b). Cartridges could also be passed from the system 100(b) to the system 100(a) in a similar manner. Advantageously, the present invention provides a tape autoloader/library system 100 that is customizable to a variety of applications with the capability of expansion at any time to provide both increased capacity and/or increased performance.

The above-described processing systems could be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are integrated circuits and logic circuitry. Those skilled in the art are familiar with instructions, processors, and storage media.

Those skilled in the art can appreciate variations of the above-described embodiments that fall within the scope of the invention. As a result, the invention is not limited to the specific embodiments discussed above, but only by the following claims and their equivalents.

What is claimed is:

1. An automated tape cartridge autoloader library system comprising:
   a housing;
   a first tape cartridge transport magazine to receive a plurality of tape cartridges;
   a read/write tape drive; and
   a tape cartridge picker comprising:
      a turntable that rotates about a central axis of rotation to exchange tape cartridges between the tape drive and the first tape cartridge transport magazine without translating the tape cartridge picker within the housing, wherein the turntable receives a tape cartridge from the first tape cartridge transport magazine and rotates to position the tape cartridge to be loaded in the tape drive, or the turntable receives a tape cartridge from the tape drive and rotates to position the tape cartridge to be loaded in the first tape cartridge transport magazine; and
      a cavity located substantially about the central axis of rotation of the turntable to receive tape cartridges.

2. The system of claim 1 further comprising:
   a second tape cartridge transport magazine to receive the plurality of tape cartridges.

3. The system of claim 2 wherein the first tape cartridge transport magazine comprises:
   a first plurality of storage locations horizontally oriented relative to the first tape cartridge transport magazine for receiving the plurality of tape cartridges; and
   a first means for transporting the first plurality of storage locations between a top portion and a bottom portion of the fist tape cartridge transport magazine.

4. The system of claim 3 wherein the second tape cartridge transport magazine comprises:
   a second plurality of storage locations horizontally oriented relative to the first tape cartridge transport magazine for receiving the plurality of tape cartridges; and
   a second means for transporting the second plurality of storage locations between a top portion and a bottom portion of the second tape cartridge transport magazine.

5. The system of claim 4, wherein the first and second plurality of storage locations comprise:
   a plurality of carriages, wherein each of the plurality of carriages is configured to receive an individual one of the plurality of tape cartridges.

6. The system of claim 5, wherein the first and second means for transporting comprises:
   a belt connecting the plurality of carriages;
   at least one drive gear connected to drive the belt; and
   a drive motor that mates with the at least one drive gear.

7. The system of claim 3 further comprising:
   a control panel comprising:
   a user interface to receive commands from the operator that control operation of the automated tape cartridge autoloader library system; and
   a display to display status information for the operator.

8. The system of claim 1 further comprising:
   a single tape cartridge interface to exchange cartridges between the tape cartridge picker and an operator.

9. An automated tape cartridge autoloader library system comprising:
   a first tape cartridge transport magazine to receive a plurality of tape cartridges;
   a tape drive; and
   a tape cartridge picker comprising:
      a turntable that rotates to exchange tape cartridges between the tape drive and the first tape cartridge transport magazine without translating the tape cartridge picker, wherein the turntable receives a tape cartridge from the first tape cartridge transport magazine and rotates to position the tape cartridge to be loaded in the tape drive or the turntable receives a tape cartridge from the tape drive and rotates to position the tape cartridge to be loaded in the first tape cartridge transport magazine.

10. The system of claim 9, wherein the turntable includes a cavity to receive a tape cartridge.

11. The system of claim 9, wherein the tape cartridge picker includes:
    a translation arm connected to the turntable, wherein the translation arm loads and unloads the tape cartridge from the turntable; and
    a pin connected to the translation arm, wherein the pin engages with a cartridge notch formed in a tape cartridge.

12. The system of claim 11, wherein the transition arm retracts, extends in a first direction, and extends in a second direction.

13. The system of claim 12, wherein the turntable rotates to:
    a first on-axis position to interface with the tape drive, wherein the pin is engaged with the cartridge notch when the turntable is in the first on-axis position; and
    a first off-axis position having an angular rotation off of the first on-axis position, wherein the pin is disengaged from the cartridge notch when the turntable is in the first off-axis position.

14. The system of claim 13, wherein the turntable rotates to:
    a second on-axis position to interface with the first tape cartridge transport magazine; and
    a second off-axis position having an angular rotation off of the second on-axis position.

15. The system of claim 9 further comprising:
    a second tape cartridge transport magazine,
    wherein the turntable rotates to interface with the tape drive, the first tape cartridge transport magazine, and the second tape cartridge transport magazine.

16. The system of claim 15 further comprising:
    a single tape cartridge interface to exchange tape cartridges between the tape cartridge picker and an operator,
    wherein the turntable rotates to interface with the tape drive, the first tape cartridge transport magazine, the second tape cartridge transport magazine, and the single tape cartridge interface.

17. The system of claim 16, wherein the cartridge picker further comprises:
    a base having:
       a first exchange port, wherein the turntable rotates to interface with the first tape cartridge transport magazine through the first exchange port;
       a second exchange port, wherein the turntable rotates to interface with the second tape cartridge transport magazine through the second exchange port;

a third exchange port, wherein the turntable rotates to interface with the tape drive through the third exchange port; and a fourth exchange port, wherein the turntable rotates to interface with the single tape cartridge interface through the fourth exchange port.

18. The system of claim 17, wherein the turntable includes a tape cartridge interface and the turntable rotates to:

a first on-axis position, wherein the tape cartridge interface of the turntable aligns with the first exchange port when the turntable is in the first on-axis position;

a second on-axis position, wherein the tape cartridge interface of the turntable aligns with the second exchange port when the turntable is in the second on-axis position;

a third on-axis position to interface with the tape drive, wherein the tape cartridge interface of the turntable aligns with the third exchange port when the turntable is in the third on-axis position; and a fourth on-axis position to interface with the single tape cartridge interface, wherein the tape cartridge interface of the turntable aligns with the fourth exchange port when the turntable is in the fourth on-axis position.

19. The system of claim 18, wherein the turntable rotates to:

a first off-axis position;

a second off-axis position;

a third off-axis position; and a fourth off-axis position.

20. The system of claim 19, wherein the turntable includes a cavity with an angled portion to receive the tape cartridge when the turntable is in the fourth off-axis position.

21. The system of claim 9, wherein the first tape cartridge transport magazine comprises:

a plurality of storage locations horizontally oriented relative to the first tape cartridge transport magazine for receiving the plurality of tape cartridges; and a drive assembly configured to transport the plurality of storage locations between a top portion and a bottom portion of the first tape cartridge transport magazine.

22. The system of claim 21, wherein the storage locations are a plurality of carriages, and wherein the drive assembly comprises a belt connected to the plurality of carriages.

23. A method of operating an automated tape cartridge autoloader library system, the method comprising:

inserting a first tape cartridge transport magazine loaded with a plurality of tape cartridges into a first magazine port in a housing, wherein the housing includes:

a tape drive; and a cartridge picker; and rotating the cartridge picker to exchange tape cartridges between the tape drive and the first tape cartridge transport magazine without translating the cartridge picker within the housing, wherein the cartridge picker receives a tape cartridge from the first tape cartridge transport magazine and rotates to position the tape cartridge to be loaded in the tape drive, or the cartridge picker receives a tape cartridge from the tape drive and rotates to position the tape cartridge to be loaded in the first tape cartridge transport magazine.

24. The method of claim 23 further comprising:

inserting a second tape cartridge transport magazine loaded with a plurality of tape cartridges into a second magazine port in the housing; and rotating the cartridge picker to exchange tape cartridges between the tape drive, the first tape cartridge transport magazine, the second tape cartridge transport magazine.

25. The method of claim 24, wherein the housing includes a single cartridge interface, and further comprising:

rotating the cartridge picker to exchange tape cartridges between the tape drive, the first tape cartridge transport magazine, the second tape cartridge transport magazine, and the single cartridge interface.

26. The method of claim 23, wherein the cartridge picker includes:

a turntable having a cavity to receive a tape cartridge;

a translation arm connected to the turntable, wherein the translation arm loads and unloads the tape cartridge from the cavity in the turntable; and a pin connected to the translation arm, wherein the pin engages with a cartridge notch in the tape cartridge.

27. The method of claim 26, wherein the turntable rotates from an off-axis position to an on-axis position to engage the pin with the cartridge notch, and wherein the turntable rotates from an on-axis position to an off-axis position to disengage the pin from the cartridge notch.

* * * * *

UNITED STATES PATENT AND TRADEMARK OFFICE
CERTIFICATE OF CORRECTION

PATENT NO. : 6,829,116 B1
DATED : December 7, 2004
INVENTOR(S) : John C. Owens et al.

It is certified that error appears in the above-identified patent and that said Letters Patent is hereby corrected as shown below:

Column 5,
Line 61, please replace "tape drive 101" with -- tape drive 101, --

Column 8,
Line 8, please replace "continuos point of contact" with -- continuous point of contact --

Column 11,
Line 2, please replace "cartridge 106 that" with -- cartridge 106 so that --

Column 14,
Line 13, please replace "the tape drive or the turntable" with -- the tape drive, or the turntable --
Line 27, please replace "wherein the transitlon arm" with -- wherein the translation arm --

Signed and Sealed this

Twenty-sixth Day of April, 2005

JON W. DUDAS
*Director of the United States Patent and Trademark Office*